United States Patent

[11] 3,544,060

| [72] | Inventors | Herbert Collier Stoltz Hershey;<br>Joseph Willard Hoffman, Liverpool; Henry William Demler, Sr., Lebanon, Pennsylvania |
|---|---|---|
| [21] | Appl. No. | 690,984 |
| [22] | Filed | Dec. 15, 1967 |
| [45] | Patented | Dec. 1, 1970 |
| [73] | Assignee | AMP Incorporated<br>Harrisburg, Pennsylvania |

[54] FLOW CONTROL VALVE
6 Claims, 31 Drawing Figs.

[52] U.S. Cl. ..................................................... 251/9;
248/229; 269/241
[51] Int. Cl. ....................................................... F16k 7/06
[50] Field of Search .......................................... 251/4, 10;
24/125(1c), 135(1c); 269/237—239; .241;
128/346

[56] References Cited
UNITED STATES PATENTS

| 282,033 | 7/1883 | Amborn et al. ............... | 269/241 |
| 584,872 | 6/1897 | Harrison ...................... | 269/241 |
| 2,680,000 | 6/1954 | Pulver ......................... | 251/8 |
| FOREIGN PATENTS | | | |
| 372,180 | 3/1923 | Germany ..................... | 269/241 |
| 731,988 | 6/1955 | Great Britain ................ | 251/9 |

Primary Examiner—William F. O'Dea
Assistant Examiner—Richard Gerard
Attorney—Curtis, Morris and Safford, Marshall M. Holcombe, William Hintze, William J. Keating, Frederick W. Raring, John R. Hopkins, Adrian J. La Rue, and Jay L. Seitchik ABSTRACT: The disclosure relates to several valves for controlling the flow of a liquid through a flexible tube and particularly to the use of same in the intravenous feeding of glucose and the like. The valves provide a pinching action on the flexible tube carrying the liquid whereby the amount of liquid passing therethrough can be accurately controlled to provide a predetermined number of drops of flow per unit of time with great accuracy.

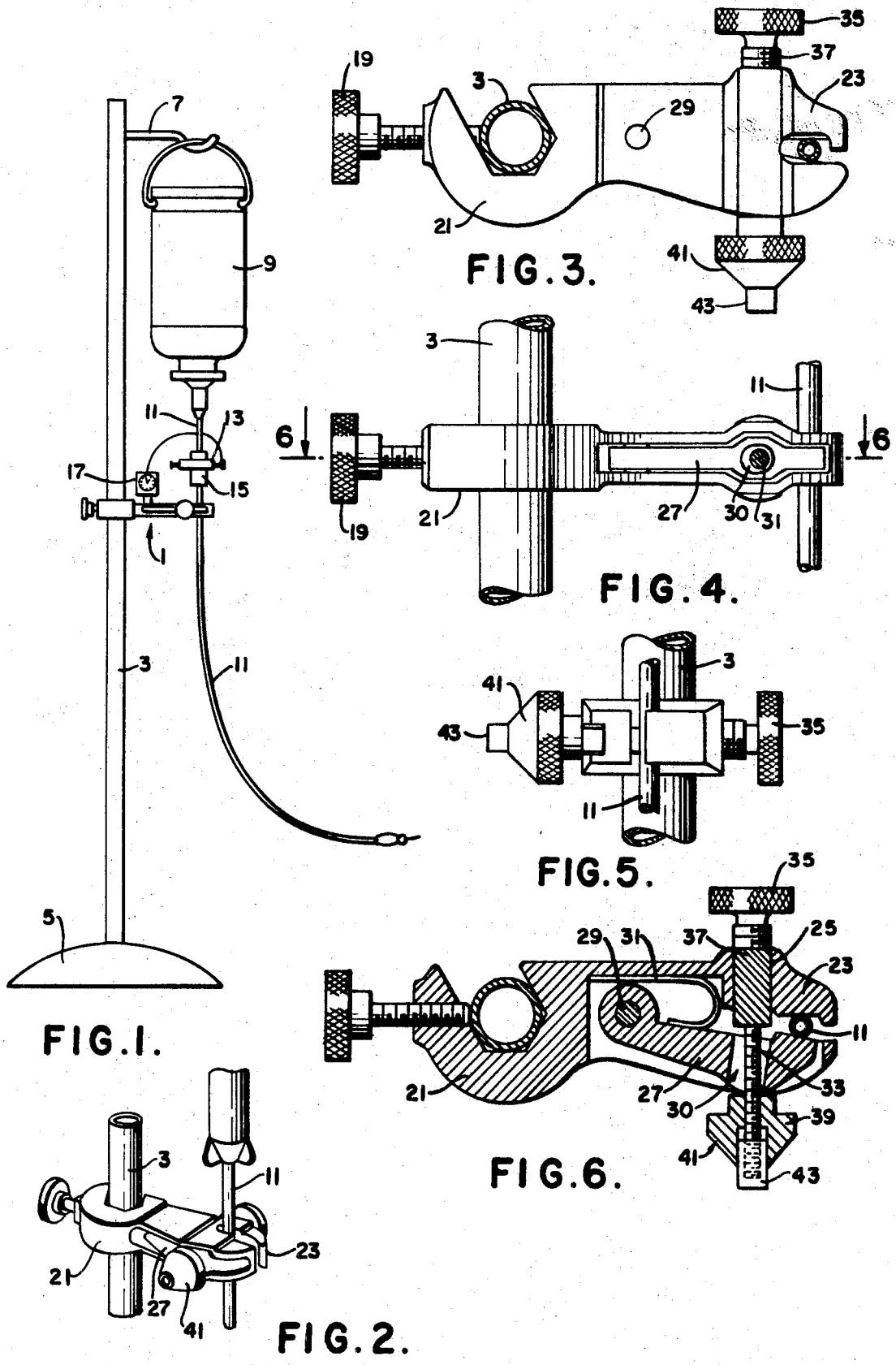

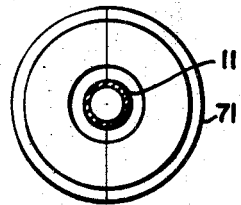
FIG.13.
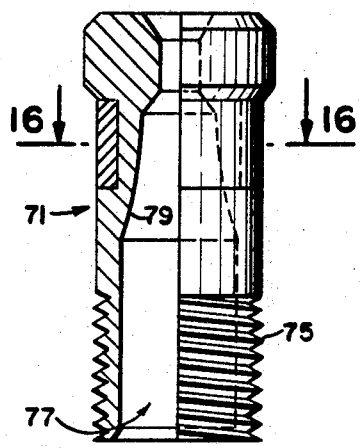
FIG.15.
FIG.16.
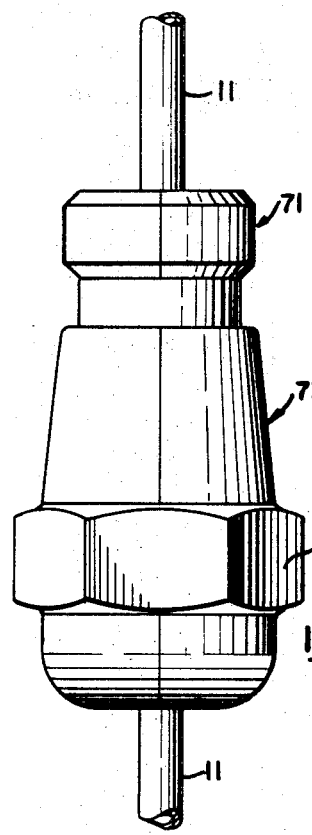
FIG.12.
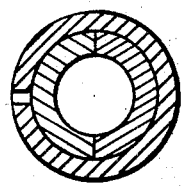
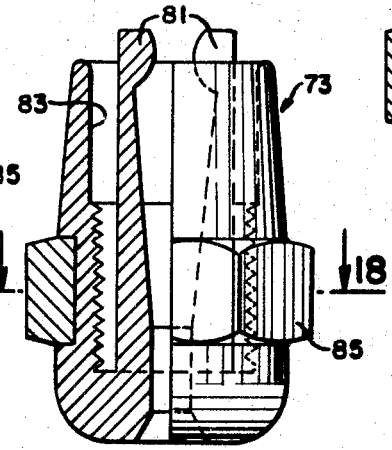
FIG.17.
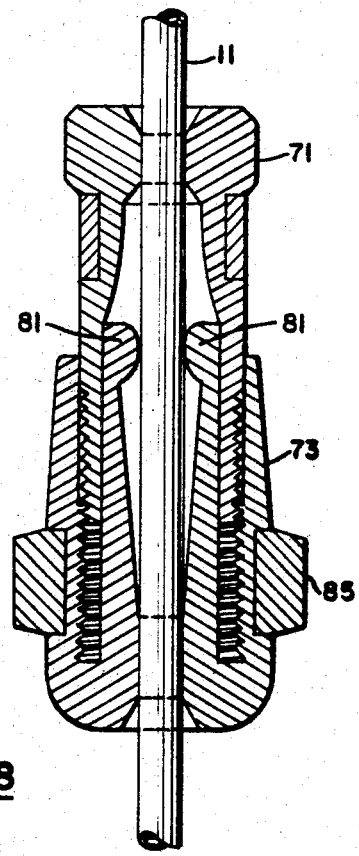
FIG.19.
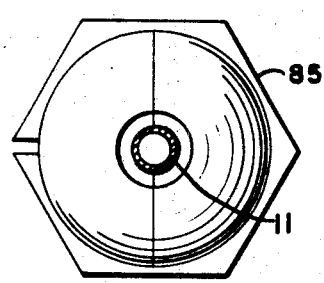
FIG.14.
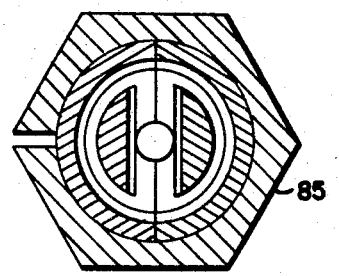
FIG.18.

3,544,060

FLOW CONTROL VALVE

The disclosure relates to a flow control valve and more specifically to a valve for controlling the flow of liquid in a flexible tube wherein the tube can be pinched to restrict the cross section thereof and thereby allow gravity flow therethrough at a predetermined and accurate rate measured in drops per unit of time.

Valves for controlling the flow of fluid in a flexible tube by pinching of the tube have been well known in the prior art and are presently in wide use, especially for regulating the flow of parenteral solutions through a tube into the human body. A typical example of such a prior art device is shown in the U.S. Pat. No. 3,099,429 to Broman and in many other similar prior art patents. The known prior art flow control valves of the type described above, while providing a very useful function in the art, have suffered from several disadvantages, the main such disadvantages comprising the inability to close the valve quickly to a point in the vicinity of the desired end condition and, further, to an inability to provide a final flow rate with sufficient ease and of sufficient accuracy.

It is an object of this invention to overcome the problems of the prior art and to provide an inexpensive plastic valve which is capable of overcoming the problems inherent in the prior art.

It is a further object in accordance with one embodiment of this invention to provide an inexpensive plastic valve with a first closure means on one side thereof constituting a quick takeup and a second closure means coacting with the first closure means providing microsetting thereof.

It is a yet further object of this invention to provide a disposable controlled flow valve which is easy to use and inexpensive to manufacture.

Briefly, the above objects of the invention are provided in one embodiment thereof by providing a pair of jaws which are movable relative to each other and a bolt having an upper threaded section of a first pitch and lower threaded section of different pitch but threaded in the same direction as the first threaded section. The upper threaded section is threaded into one of the jaw members of the valve and the lower threaded section passes through an aperture in the other jaw member, the far end of the lower threaded section being threaded into a nut. Rotation of the nut will cause the jaws to come together at a rate determined by the pitch of the lower threads, this being a quick takeup.

Rotation of the upper threads by rotation of a head secured thereto, on the other hand, will again cause the lower jaw to move toward the upper jaw in accordance with the pitch of the lower half of the bolt. However, simultaneously, the rotation of the bolt in the upper jaw member will cause this jaw member to move away from the lower jaw member. Thereby, the jaws will approach each other in accordance with the difference in the pitches of the two sections of the bolt, this being a microadjustment. In this manner, the jaws can be moved together either quickly or by microadjustment, merely by rotating either the nut or the head secured to the bolt.

In accordance with a second and third embodiment of the invention, there is provided a pair of mating screw members, one of the screw members having an aperture therethrough for receiving a flexible tube and a flexible pair of forward jaws. The other screw member has an angular inner surface upon which the jaw members ride. As the screw members are more tightly fitted together, the surface angle of the outer threaded member will cause the jaws to constrict upon the flexible tube and thereby provide continual construction thereof by mere rotation of the threaded members within each other, in this manner accurately regulating and controlling the flow of fluid through the flexible tube.

In accordance with a fourth embodiment of the invention, there is provided a housing having an aperture through one sidewall thereof through which a flexible tube will pass. Secured to the sidewall of the housing is a pivotable camming member which can be rotated to cam against the flexible tube and constrict the same to control the flow of liquid therethrough, the camming member having serrations on the side thereof away from the tube member. The side of the housing opposite the side through which the tube passes includes a pair of grooves extending inwardly toward or parallel to the tube into which is secured a roller having serrations around the periphery thereof. These serration mate with the serrations of the camming member and, as the roller is moved forward in the grooves, the camming member is pivoted around the pivot point to provide additional camming action against the flexible tube and thereby continually constrict the flow passage in the tube. In this manner, the flow of fluid through the tube can be quickly and accurately regulated.

The above objects of the invention and still further objects of the invention will immediately become apparent to those skilled in the art upon reading of the following description of preferred embodiments thereof when taken in conjunction with the accompanying drawings, wherein:

FIG. 1 is a view in elevation of the flow control valve of a first embodiment of the present invention utilized in conjunction with a stand and a solution container;

FIG. 2 is an enlarged view of the control valve of FIG. 1;

FIG. 3 is a top view of the control valve in accordance with a first embodiment of the invention as also shown in FIGS. 1 and 2;

FIG. 4 is a side view of a control valve of FIG. 3;

FIG. 5 is an enlarged view of the control portion of the valve in accordance with the first embodiment of the invention;

FIG. 6 is a view taken along the line 6–6 of FIG. 4;

FIG. 12 is a view in elevation of a third embodiment of a tube constricting valve in accordance with the present invention;

FIG. 13 is a top view of the embodiment of FIG. 12;

FIG. 14 is a bottom view of the embodiment of FIG. 12;

FIG. 15 is a sectional view of the male member of the valve of FIG. 12;

FIG. 16 is a view taken along the line 16–16 of FIG. 15;

FIG. 17 is a section view of the female part of the valve of FIG.12;

FIG. 18 is a sectional view taken along the line 18–18 of FIG. 17;

FIG. 19 is a sectional view of two valve halves of FIGS. 15 and 17 in assembled condition;

Figure 7:
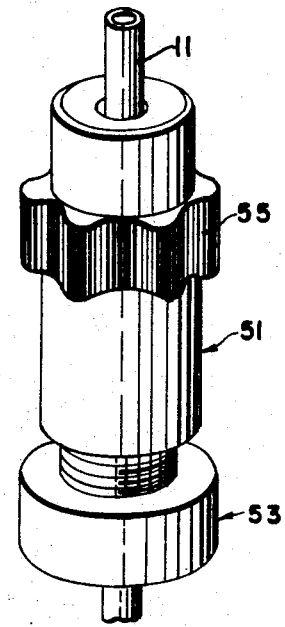
FIG. 7 is a view in elevation of a tube constricting valve in accordance with a second embodiment of the invention.
Figure 8:
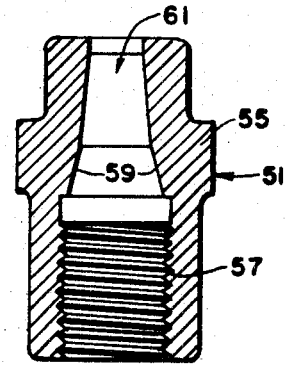
FIG. 8 is a side sectional view of the female part of the valve of FIG. 7.
Figure 9:
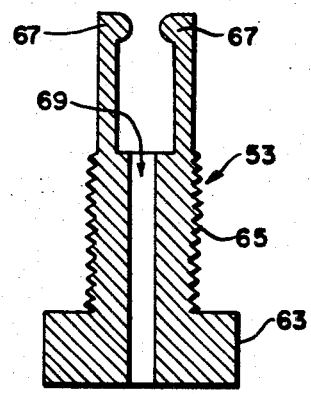
FIG. 9 is a side sectional view of the male part of the valve of FIG. 7.

Referring first to FIG. 1, there is shown a schematic view of the valve of the first embodiment of the invention indicated as 1 and in place on a stand 3 with associated equipment. The stand 3 is secured on a base 5, there being a hook 7 secured to the stand 3 on which a container 9 of fluid can be hung. Secured to the container 9 is a flexible dispensing tube 11 onto which is attached a drop count attachment 13 with a drop chamber 15. A fluid flow rate meter 17 is secured to the drop count attachment 13 for providing a reading of the flow rate. The flow control valve 1 is secured to the stand 3 (better shown in FIGS. 3, 4 and 6) by securing the stand member 3 therein. This is provided by rotation of a screw 19 which is threaded in the body of the flow control valve and locks the stand member 3 in the mounting clamp portion 21 thereof.

The valve includes, as a part of the body thereof, an arm or jaw member 23 having a threaded portion 25 (better shown in FIG. 6). Within the arm 23 is positioned a second arm 27 which is pivotally connected to a pivot 29, the pivot being secured in the walls of the jaw 23. A leaf spring member 31 is positioned within the body of the jaw 23 as shown in FIG. 6 and provides biasing against the jaw 27 to force said jaw 27 in a clockwise direction (as shown in FIG. 6) and tends to separate the jaw members 23 and 27 from each other. The jaw member 27 also includes an aperture 30 therein. A bolt 33 is provided having a head portion 35, a threaded portion 37 of a first pitch for threadedly engaging the bolt 33 to the threaded portion 25 of the jaw 23. The bolt 33 includes a second threaded portion 39 of different pitch but same pitch direction as the threaded portion 37, the PITCH OF the section 39 being greater than than of the section 37, the lower section of the bolt 33 passing through the aperture 30. A nut 41 is threaded onto the threaded portion 39 of the bolt 33 below the jaw 27 and is secured against rotation of the bolt by a stop member 43 which can be in the form of a plastic guard or the like fitting over the end of the bolt 33. The tube to be controlled is positioned between the jaws 23 and 27 and shown by the designation 11 in FIG. 6.

The flow control valve of FIGS. 3 to 6 is operated in the first or rapid takeup condition by rotation of the nut 41. Rotation of this nut 41 in the proper direction will cause the nut to ride up on the bolt 33 and cause the lower jaw member 27 to pivot counterclockwise about the pivot 29 and at a speed corresponding to the pitch of the section 39 of the bolt 33. Rotation of the nut 41 corresponds to the "quick takeup" condition.

Microadjustment takes place by rotating the head 35 of the bolt 33. Rotation of the head 35 will cause the threaded portion 37 thereof to rotate in the threaded section 25 of the jaw 23 and force the jaw 23 upward. Actually bolt 33 is being threaded in or backed out, depending on direction of rotation of the bolt 33. At the same time, the threaded portion 39 of the bolt 33 which passes through the aperture 29 of the jaw 27 will be rotated in the nut 41 which is stationary in rotation, but based on jaw 27, and cause the jaw 27 to rotate in a counterclockwise condition about the pivot 29. It is therefore seen that the jaws 23 and 27 will both be rotating in the counterclockwise direction or in the same direction, however, the rate of movement of each jaw, which depends upon the pitch of the threaded portions of the bolt 33 will be different for each jaw. Therefore, assuming that the pitch of the section 37 of the bolt is 28 and the pitch of the section 39 is 32, the jaws will move toward each other effectively at the rate of .004 of an inch per revolution. In this manner, closure of the jaws on the tube 11 will be very slow relative to the rate of rotation of the head 35.

Referring now to the second embodiment of the invention which is shown in FIGS. 7 to 11, the valve includes a male portion 53 and a female portion 51 which can be screwed together by means of a pair of mating threads, one within the female portion and the other at the outer surface of the male portion. The female portion 51 includes a gripping portion 55 for rotation of the two members 51 and 53 with respect to each other. The female portion includes a threaded section 57 and an inwardly angled surface 59 extending toward an outer passage 61 through which a tube 11 will pass. The male member 53 includes a gripping portion 63 and a threaded section 65 for threaded engagement with the threaded member 57 of the female member 51. The male member also includes a pair of flexible jaws 67 and an aperture 69, the tube 11 passing through the aperture 69 and between the jaws 67.

Figure 10:
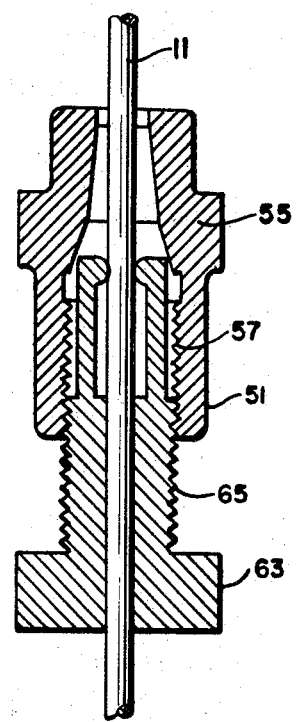
FIG. 10 is a sectional view of the two halves of the valve as shown in FIGS. 8 and 9 with the jaw members in the nonconstricting condition.
Figure 11:
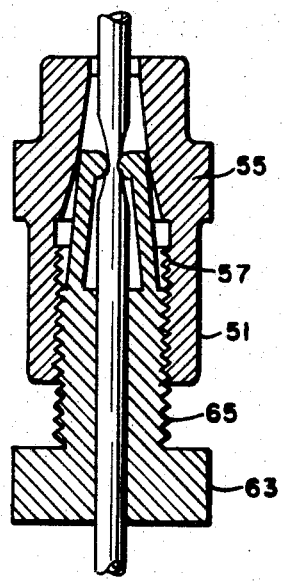
FIG. 11 is a sectional view as in FIG. 10 but with the jaw members in the constricting condition.
Figure 21:
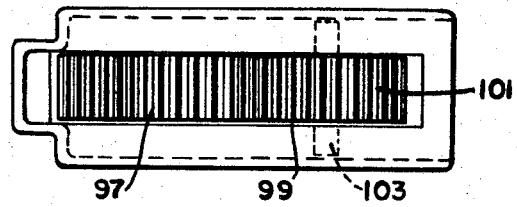
FIG. 21 is a top view of the flow control valve of FIG. 20.
Figure 22:
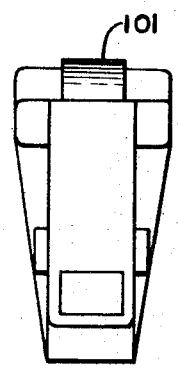
FIG. 22 is a view taken along one side of the valve of FIG. 20.

The male and female members are threaded one within the other with a tube 11 passing therethrough as shown in FIG. 10. The jaws 67 pass inwardly until they make contact with the angled surface 59. Up to this time, no constriction of the tube takes place as shown in FIG. 10. Further rotation of the members 51 and 53 relative to each other causes the jaws 67 to move inwardly and against the angled surface 59, this causing the jaws to move inwardly toward each other and against the tube 11, thereby causing constriction of the tube 11 as shown in FIG. 11. As the members 51 and 53 continue to be rotated relative to each other, the jaws 57 will continue to be moved farther inwardly against the angled surface 59 and increase the construction of the tube 11, thereby providing a regulation or control of the passage therein and the amount of fluid that can pass therethrough.

Referring now to FIGS. 13 to 19, there is shown a third embodiment of the invention which is similar to the second embodiment shown in FIGS. 7 to 11. This embodiment includes a male member 71 and a female member 73 with the tube 11 passing therethrough. The male member 71 includes a threaded portion 75 and a hollow portion 77 therein with the downstream end thereof having an inwardly beveled section 79. The female member includes a pair of flexible jaw members 81 secured to the housing thereof and having a threaded section 83 for receiving the threaded section 75 of the male member 71. The female member 73 also includes a section thereof for gripping labelled 85. The male member is threaded into the female member as in the embodiment of FIGS. 7 to 11 until the flexible jaw members 81 begin to abut the beveled section 79 at the interior of the male member 71 as shown in FIG. 19. further rotation of the male member relative to the female member will cause the jaw members 81 to enter farther into the male member and cause an inward movement thereof, thereby constricting the tube 11 and controlling the flow of fluid therethrough as in the embodiment of FIGS. 7 to 11.

Figure 20:
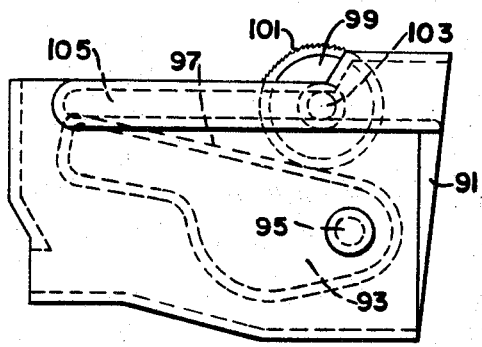
FIG. 20 is a flow control valve shown in elevation in accordance with a fourth embodiment of the present invention.
Figure 23:
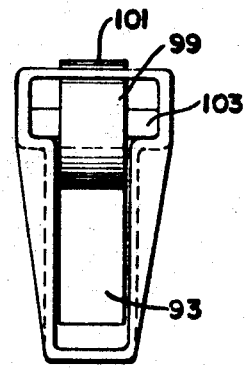
FIG. 23 is a view taken along the other side of the valve of FIG. 20.
Figure 25:
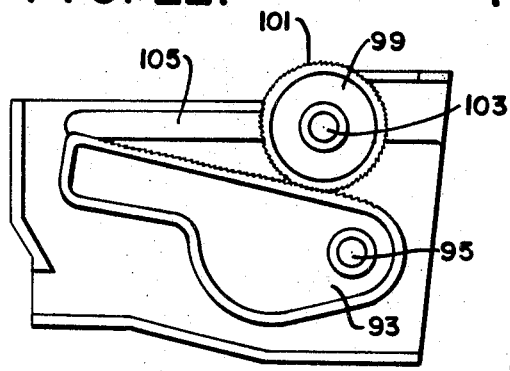
FIG. 25 is a view of the valve of FIG. 20 in its partially closed or partially constricting condition.
Figure 24:
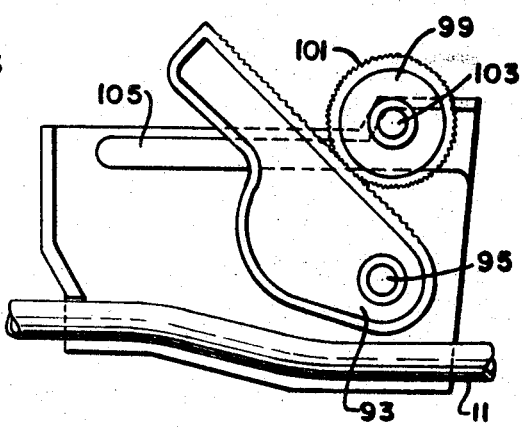
FIG. 24 is a view in elevation of the valve of FIG. 20 in its fully open condition.
Figure 26:
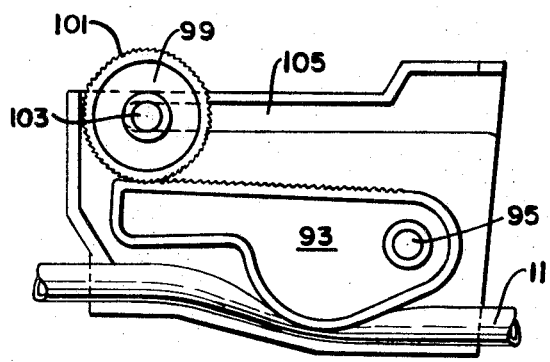
FIG. 26 is a view of the valve of FIG. 20 in its fully closed or fully constricting condition.
Figure 27:
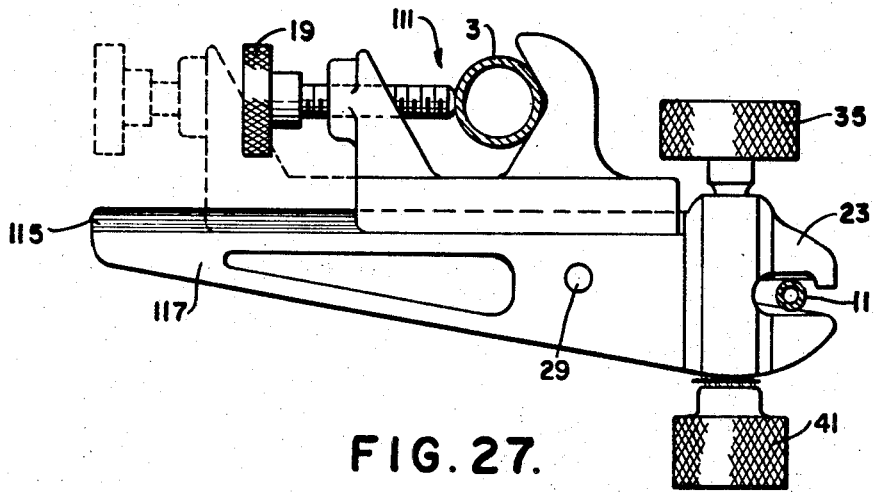
FIG. 27 is a side view of a fifth embodiment of the valve of the present invention with a slide, regulator valve telescoping clamp.
Figure 28:
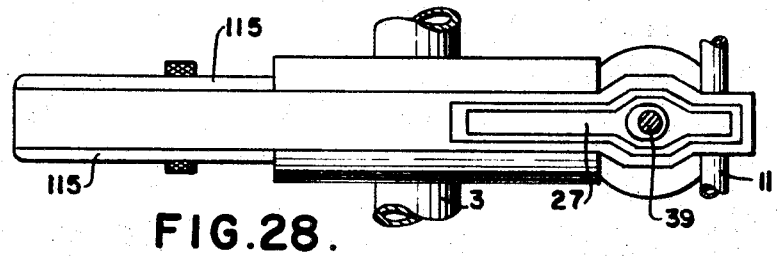
FIG. 28 is a bottom view of the embodiment of FIG. 27.
Figure 29:
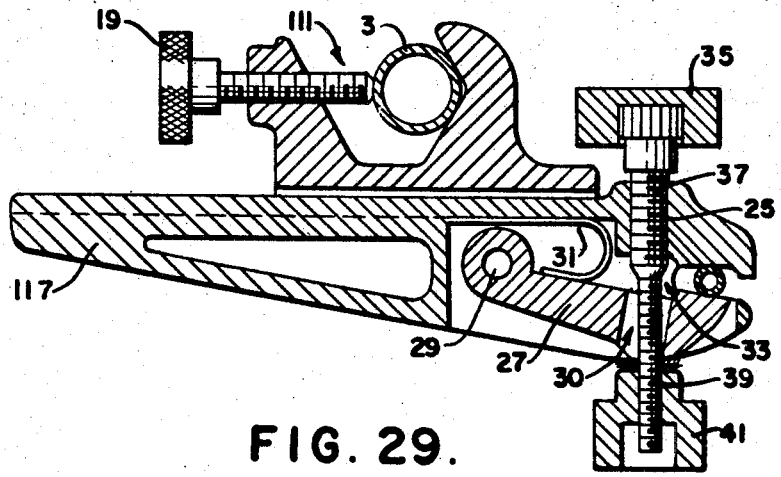
FIG. 29 is a cross-sectional view of FIG. 27.
Figure 30:
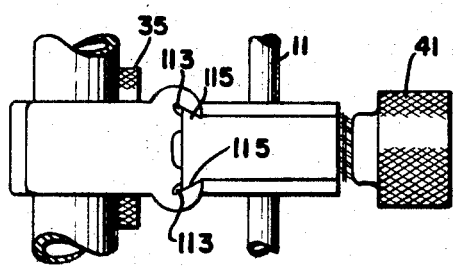
FIG. 30 is an end view taken from the left end of the embodiment of FIG. 27.
Figure 31:
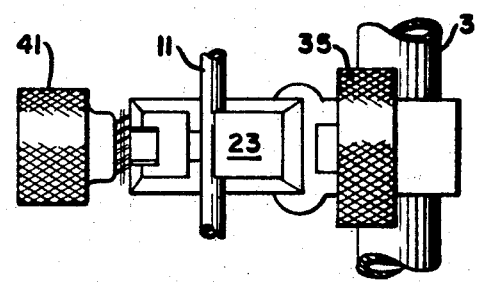
FIG. 31 is an end view taken from the right end of the embodiment of FIG. 27.

FIGS. 20 to 26 disclose a fourth embodiment of the invention, FIG. 20 showing the clamp valve thereof for allowing a precisely controlled flow of fluid to pass through a tube 11 extending therethrough as shown more clearly in FIGS. 24 and 26. The valve includes a body 91 in which is mounted a rotatable cam member 93 which is rotatable about a pivot 95 secured within the body 91. The top portion 97 of the cam member 93 is serrated. A roller 99 having serrations 101 around its outer periphery for mating with the serrations 97 on the top surface of the cam lever 93 is secured within the body 91 by means of an axle 103 therethrough which is secured within a pair of grooves 105, one such groove being formed in each of the side members of the body member 51. The groove on the right-hand side thereof enlarges away from the axis of the grooves 105 as shown in FIG. 20 so that the roller 99 and axle 103 therethrough can move upwardly away from the cam lever and thereby provide no biasing action thereon when in the fully opened position as shown in more detail in FIG. 24.

It will be seen in FIG. 24 that roller 99 is at the extreme right-hand section of the groove and in the enlarged portion thereof, thereby allowing the cam lever to be rotatable to its maximum clockwise position as shown therein and not provide any camming action against the tube 11. Therefore, as shown in FIG. 24, there is no constriction of the tube 11. As the roller 99 is moved to the left, as shown in FIG. 25, in the groove 105, the serrations 101 therein will mate with the serrations 97 of the cam lever 93 and gradually force the cam lever in a counterclockwise direction against the tube 11. As the roller 99 is moved to the left in the grooves, the camming action will become greater and the constriction of the tube 11 will increase, thereby decreasing the flow of fluid therethrough as shown in FIG. 25. Maximum construction of the tube 11 is obtained by moving the roller 99 to the far left hand position in the groove 105 as shown in FIG. 26. In this manner, movement of the roller 99 along the groove will cause continued constriction of the tube 11 and thereby cause regulation of the flow of fluid therein. The provision of the serrations in both the outer surface of the roller and the top surface of the cam lever will provide a frictional force which will prevent slippage and movement of the roller relative to the top serrated surface of the cam lever and thereby prevent changes of flow rate during operation and after a setting has been made.

Referring now to FIGS. 27 to 31, there is shown a slide, regulator valve telescoping clamp in accordance with the present invention. This clamp can be used with a valve member of the type shown in FIGS. 1 to 6. Items in FIGS. 27 to 31 which correspond to items in FIGS. 1 to 6 are marked with the same character references.

As stated above, the valve portion of FIGS. 27 to 31 operate in the same manner as the valve of FIGS. 1 to 6. Therefore the valve operation will not be repeated. However, the clamp portion for securing the valve to the stand 3, in accordance with the embodiment of FIGS. 27 to 31 makes a sliding telescoping fit with the valve portion whereby the valve can be adjusted in position relative to the stand.

The clamp portion 111 includes a screw 19, threadedly mounted in the clamp portion which locks to the stand 3 by rotation of the screw as in FIGS. 1 to 6. The clamp portion includes a pair of outwardly extending grooves 113 (shown in FIG. 30) which mate with outwardly extending flange members 115 which form a part of the body 117 of the valve. The dimensions of the flange portions 115 are such as to provide a good frictional fit in the grooves 113 whereby the valve portion can be moved along the grooves 113 to the desired position as shown in phantom in FIG. 27.

Though the invention has been described with respect to certain preferred embodiments thereof, many variations and modifications will immediately become apparent to those skilled in the art.

We Claim:

1. A flow control valve comprising first and second constricting members, pivot means pivotally connecting said constricting members for movement relative to each other, means for moving said constricting members relative to each other including a threaded member having a first threaded portion of a first pitch in threaded engagement with said first constricting member and a second threaded portion of a second pitch different from said first pitch, said second threaded portion passing freely through an opening in said second constricting member, means on said first threaded portion adjacent said first constricting member for operating said threaded member to move said constricting members relative to each other at a rate of movement in accordance with the pitch of said first threaded portion, and means threadably mounted on said second threaded portion and in engagement with said second constricting member and threadably movable along said second threaded portion to move said constricting members relative to each other at a rate of movement in accordance with the pitch of said second threaded portion.

2. A flow control valve as set forth in claim 1 wherein said threaded portions each have the same pitch direction.

3. A flow control valve as set forth in claim 1 further including biasing means for biasing said constricting members away from each other.

4. A flow control valve as set forth in claim 1 further including clamping means on said valve.

5. A flow control valve as set forth in claim 4 wherein said valve member includes a pair of flanged members extending outwardly in opposing direction, said clamping means including a pair of grooves mating with said flanges whereby said clamping means is frictionably slidable on said flanges.

6. A flow control valve as set forth in claim 1 wherein said second constricting member is movably mounted within said first constricting member.